United States Patent
LaFreniere et al.

(10) Patent No.: US 9,197,757 B2
(45) Date of Patent: *Nov. 24, 2015

(54) SYSTEM AND METHOD FOR SET-TOP BOX CALL CONNECTION

(75) Inventors: Gary W. LaFreniere, Olathe, KS (US); David Emerson, Overland Park, KS (US); David Rondeau, Olathe, KS (US); Michael Goergen, Bend, OR (US)

(73) Assignee: CenturyLink Intellectual Property LLC, Denver, CO (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/201,709

(22) Filed: Aug. 29, 2008

(65) Prior Publication Data

US 2010/0054436 A1 Mar. 4, 2010

(51) Int. Cl.
| | |
|---|---|
| H04N 7/173 | (2011.01) |
| H04M 11/08 | (2006.01) |
| H04L 12/28 | (2006.01) |
| H04M 7/00 | (2006.01) |
| H04N 21/422 | (2011.01) |
| H04N 21/478 | (2011.01) |
| H04N 21/61 | (2011.01) |
| H04M 3/533 | (2006.01) |

(52) U.S. Cl.
CPC ......... *H04M 11/085* (2013.01); *H04L 12/2898* (2013.01); *H04M 7/0069* (2013.01); *H04N 21/42203* (2013.01); *H04N 21/478* (2013.01); *H04N 21/6187* (2013.01); *H04M 3/533* (2013.01)

(58) Field of Classification Search
None
See application file for complete search history.

(56) References Cited

U.S. PATENT DOCUMENTS

| | | | |
|---|---|---|---|
| 5,262,860 A | 11/1993 | Fitzpatrick et al. | |
| 5,708,478 A * | 1/1998 | Tognazzini | 348/552 |
| 6,357,046 B1 * | 3/2002 | Thompson et al. | 725/139 |
| 6,535,590 B2 | 3/2003 | Tidwell et al. | |
| 6,606,481 B1 | 8/2003 | Tegler et al. | |
| 7,412,036 B1 | 8/2008 | Charpentier et al. | |
| 8,856,849 B2 | 10/2014 | LaFreniere et al. | |
| 2002/0149705 A1 | 10/2002 | Allen et al. | |
| 2003/0014754 A1 * | 1/2003 | Chang | 725/60 |
| 2003/0046695 A1 * | 3/2003 | Billmaier et al. | 725/39 |

(Continued)

FOREIGN PATENT DOCUMENTS

WO  WO 2008090752 A1 * 7/2008 ............. G01C 21/00

OTHER PUBLICATIONS

U.S. Appl. No. 12/201,668; Advisory Action dated Nov. 7, 2011; 3 pages.

(Continued)

*Primary Examiner* — Joshua Taylor
(74) *Attorney, Agent, or Firm* — Swanson & Bratschun, L.L.C.

(57) ABSTRACT

A system for initiating a voice call includes a set-top box operable to control a selection of a television channel for display on a television. The set-top box is further operable to initiate a voice call between a first telephone and a second telephone. The first telephone is associated with a first telephone network and the second telephone is associated with a second telephone network. The system includes a remote control in communication with the set-top box. The remote control is operable to receive a first input associated with the selection of the television channel from a user and a second input associated with the voice call. The voice call is initiated by the set-top box in response to the second input being received by the set-top box.

15 Claims, 12 Drawing Sheets

(56) References Cited

U.S. PATENT DOCUMENTS

| | | | |
|---|---|---|---|
| 2004/0177370 A1 | 9/2004 | Dudkiewicz | |
| 2004/0218740 A1* | 11/2004 | Benini et al. | 379/114.1 |
| 2005/0039214 A1 | 2/2005 | Lorenz et al. | |
| 2005/0091694 A1* | 4/2005 | Rambo | 725/110 |
| 2006/0253330 A1 | 11/2006 | Maggio et al. | |
| 2006/0271968 A1 | 11/2006 | Zellner | |
| 2007/0025338 A1 | 2/2007 | Benditovich et al. | |
| 2007/0050816 A1* | 3/2007 | Davis et al. | 725/47 |
| 2008/0042978 A1* | 2/2008 | Perez-Noguera | 345/168 |
| 2008/0086700 A1* | 4/2008 | Rodriguez et al. | 715/804 |
| 2008/0104630 A1* | 5/2008 | Bruce et al. | 725/31 |
| 2008/0120668 A1 | 5/2008 | Yau | |
| 2008/0152110 A1* | 6/2008 | Underwood et al. | 379/142.16 |
| 2008/0186218 A1 | 8/2008 | Ohkuri et al. | |
| 2009/0187956 A1 | 7/2009 | Sommer | |
| 2009/0251407 A1* | 10/2009 | Flake et al. | 345/156 |
| 2009/0259473 A1* | 10/2009 | Chang et al. | 704/260 |
| 2009/0320076 A1* | 12/2009 | Chang | 725/60 |
| 2010/0054436 A1 | 3/2010 | LaFreniere et al. | |
| 2010/0058407 A1 | 3/2010 | LaFreniere et al. | |
| 2010/0058408 A1 | 3/2010 | LaFreniere et al. | |
| 2010/0146546 A1* | 6/2010 | Nishimura et al. | 725/39 |

OTHER PUBLICATIONS

U.S. Appl. No. 12/201,668; Final Rejection dated Feb. 13, 2014; 25 pages.

U.S. Appl. No. 12/201,668; Final Rejection dated Aug. 2, 2011; 23 pages.

U.S. Appl. No. 12/201,668; Final Rejection dated Oct. 23, 2012; 22 pages.

U.S. Appl. No. 12/201,668; Non-Final Rejection dated Feb. 14, 2011; 24 pages.

U.S. Appl. No. 12/201,668; Non-Final Rejection dated Jul. 6, 2012; 19 pages.

U.S. Appl. No. 12/201,668; Non-Final Rejection dated Aug. 30, 2013; 30 pages.

U.S. Appl. No. 12/201,763; Final Rejection dated Aug. 29, 2011; 20 pages.

U.S. Appl. No. 12/201,763; Final Rejection dated Oct. 15, 2012; 21 pages.

U.S. Appl. No. 12/201,763; Issue Notification dated Sep. 18, 2014; 1 page.

U.S. Appl. No. 12/201,763; Non-Final Rejection dated Mar. 1, 2011; 17 pages.

U.S. Appl. No. 12/201,763; Non-Final Rejection dated Jul. 5, 2012; 25 pages.

U.S. Appl. No. 12/201,763; Non-Final Rejection dated Nov. 22, 2013; 24 pages.

U.S. Appl. No. 12/201,763; Notice of Allowance dated Jun. 6, 2014; 14 pages.

U.S. Appl. No. 12/201,668; Non-Final Rejection dated Feb. 25, 2015; 27 pages.

U.S. Appl. No. 12/201,668; Notice of Allowance dated Jul. 31, 2015; 14 pages.

* cited by examiner

SYSTEM AND METHOD FOR SET-TOP BOX CALL CONNECTION

BACKGROUND OF THE INVENTION

Many improvements have been made recently in the functionality provided through a user's integrated set-top box, which provides a user with access to entertainment media such as audio and video signals. It has been desired that the home entertainment and communication experience be simplified by incorporating multiple media and communication functions into a single piece of centralized hardware. However, some functionalities, such as outbound telephone calling, have remained limited to legacy systems and ideas.

SUMMARY OF THE INVENTION

In one embodiment of the present invention, a system for initiating a voice call is disclosed that includes a set-top box operable to control a selection of a television channel for display on a television. The set-top box is further operable to initiate a voice call between a first telephone and a second telephone. The first telephone is associated with a first telephone network and the second telephone is associated with a second telephone network. The system includes a remote control in communication with the set-top box. The remote control is operable to receive a first input associated with the selection of the television channel from a user and a second input associated with the voice call. The voice call is initiated by the set-top box in response to the second input being received by the set-top box.

Further details and advantages of the present invention will be discussed in the following detailed description of the preferred embodiments.

DETAILED DESCRIPTION OF THE DRAWINGS

Figure 1:
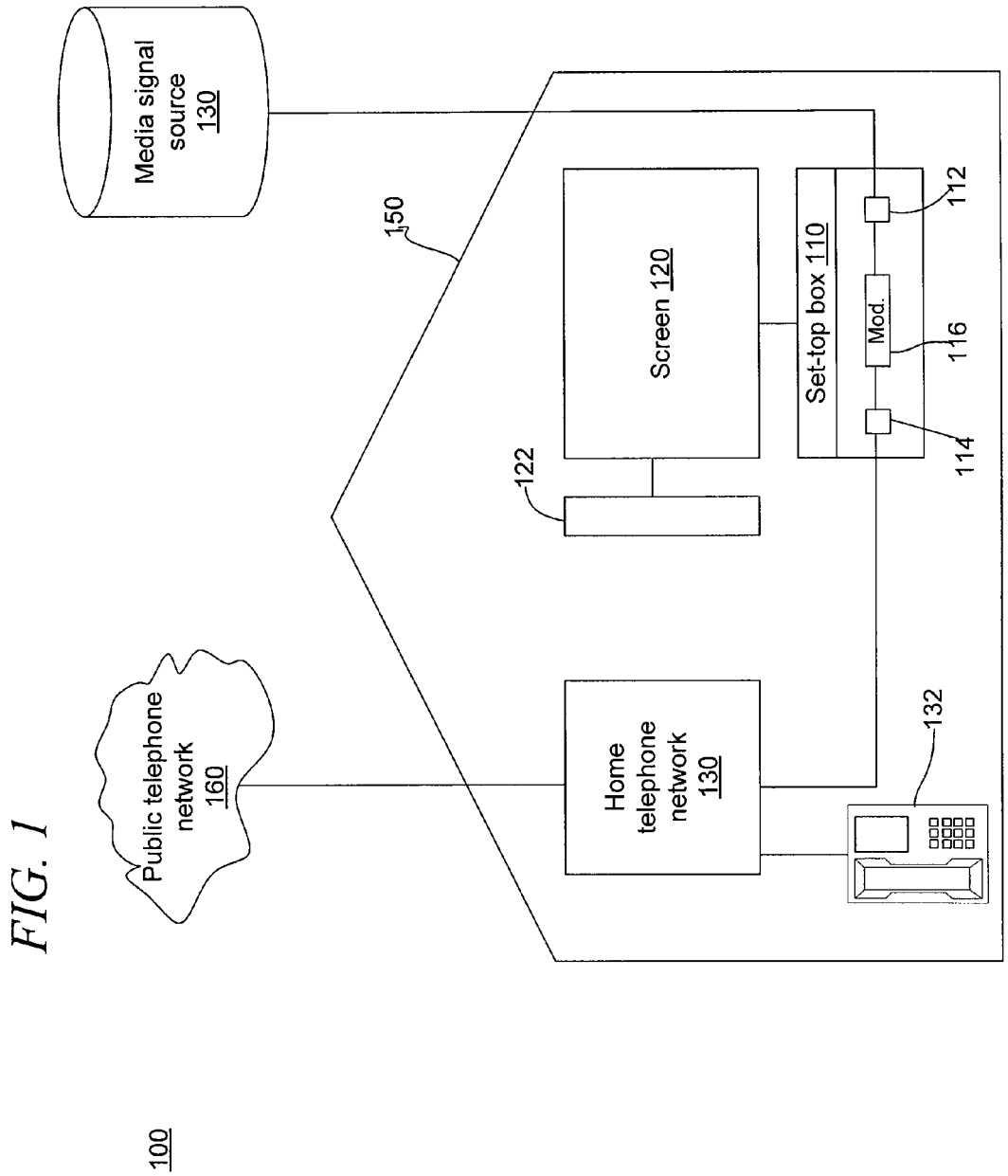
FIG. 1 is an illustration of one embodiment of an exemplary environment for providing media signals and communications in accordance with the principles of the present invention.

FIG. 1 shows an illustrative entertainment and communication network 100 in accordance to an embodiment of the present invention. As shown in FIG. 1, an integrated set-top box 110 may be located in a user's home 150. The set-top box 110 may include a media connection 112 configured receive media signals, such as audio, video, graphics, and text signals, for display on a screen 120 and speaker 122 connected to set-top box 110. Screen 120 and speaker 122 may also be integrated with set-top box 110 as a single piece of hardware. Connection 112 may be configured to receive media signals from a media signal source 130 located outside of home 150. For example, media signal source 130 may be a cable system headend, a satellite television source, or an Internet source of media signals. Set-top box 110 may further include a telephone connection 114 connected to a local telephone network 130. Other telephone devices 132 may also be connected to the local telephone network 130. Telephone devices 132 may be standalone telephones or may be telephones integrated into other electronic devices, such as refrigerators, gaming devices, etc. The local telephone network 130 may be connected to a public telephone network 160 outside home 150 such as the publicly switched telephone network. Set-top box 110 may further include a modem 116 connected to the public telephone network 160 via the telephone connection 114. Modem 116 may be used to implement the outbound calling functions of the current invention.

Figure 2:
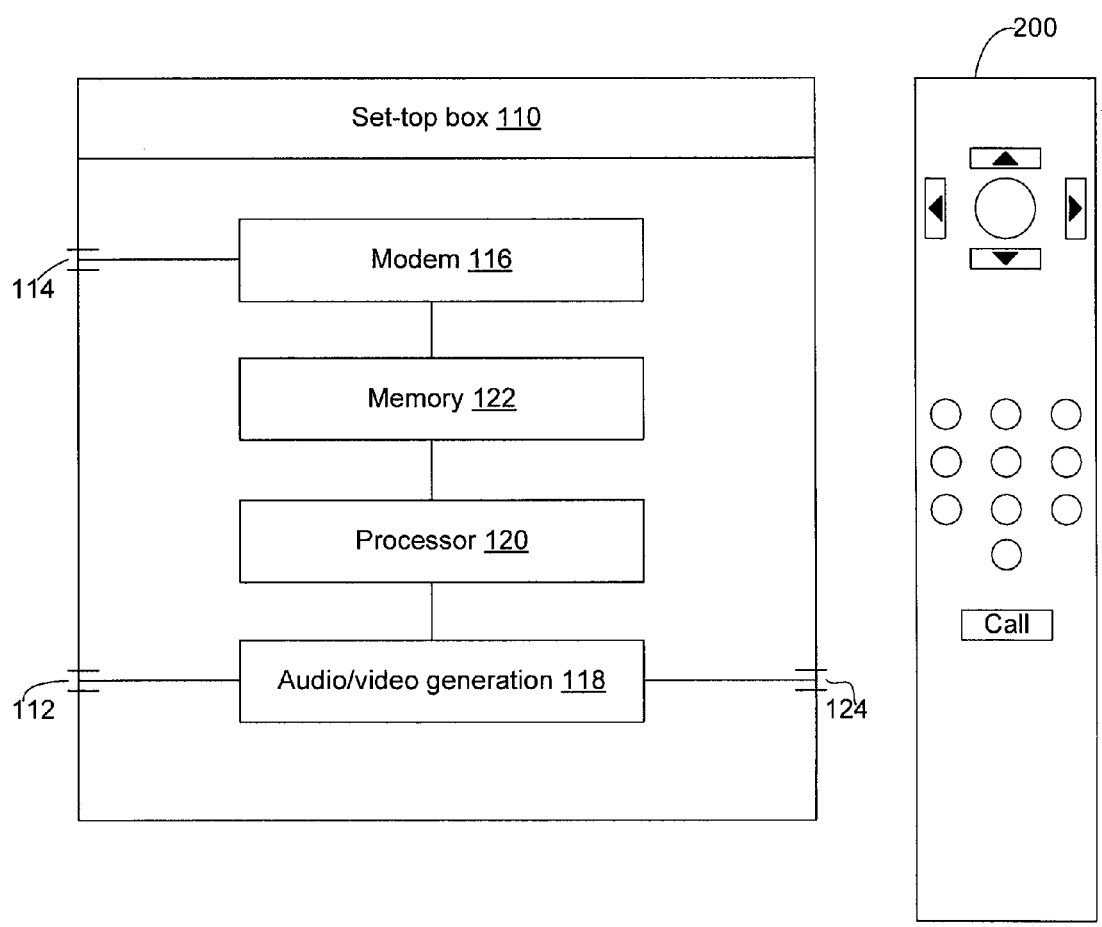
FIG. 2 is an illustration of one embodiment of an exemplary hardware configuration in accordance with the principles of the present invention.

FIG. 2 shows further details of an illustrative set-top box 110 in accordance with an embodiment of the present invention. As shown, set-top box 110 may include a modem 116 configured to initiate outbound telephone calls. In one embodiment, telephone connection 114 may be configured to receive a standard RJ11 telephone jack and may connect modem 116 to the home telephone network 130. Set-top box 110 may also include an audio/video generator 118, which may receive media signals through media connection 112 and generate appropriate audio or video output for transmission to screen 120 and speakers 122 via audio/video output 124. In one embodiment, media signal connection 112 may be configured to receive a standard coaxial cable used to transmit television signals. It should be understood, however, that both telephone connection 114 and media signal connection 112 may utilize any of a number of communication interfaces suitable for transmitting telephone and media signals. As shown in FIG. 2, set-top box 110 may further include a processor 122 for controlling operation of the set-top box and a memory 124 for storing operating software and other data, such as program guide information, telephone directory information, etc. A user input device 200, such as a remote control, may be provided to enable a user to input commands to set-top box 110. The functionality of user input device 200 will be discussed further below with respect to exemplary methods of the present invention.

In operation, processor 122 may control the operation of set-top box 110 using software stored on memory 124. Memory 124 may also store other data useful for the outbound calling functionality, such as a directory of telephone numbers personalized to the user of the set-top box. When a user indicates a desire to place an outbound telephone call using control device 200, the processor 122 may issue one or more commands to audio/video generator 118 to display certain menus to be used by the user to input a desired outbound telephone number. Once the user inputs the desired telephone number for the outbound call to processor 122, the processor 122 may issue further commands to modem 116 to dial the user input telephone number to initiate the call via connection 114. It should be understood that the hardware configuration of FIGS. 1 and 2 are merely illustrative embodiments for implementing the present invention. Other suitable hardware configurations may be readily adopted by one of ordinary skill in the art to implement the functions of the present invention.

Figure 3:
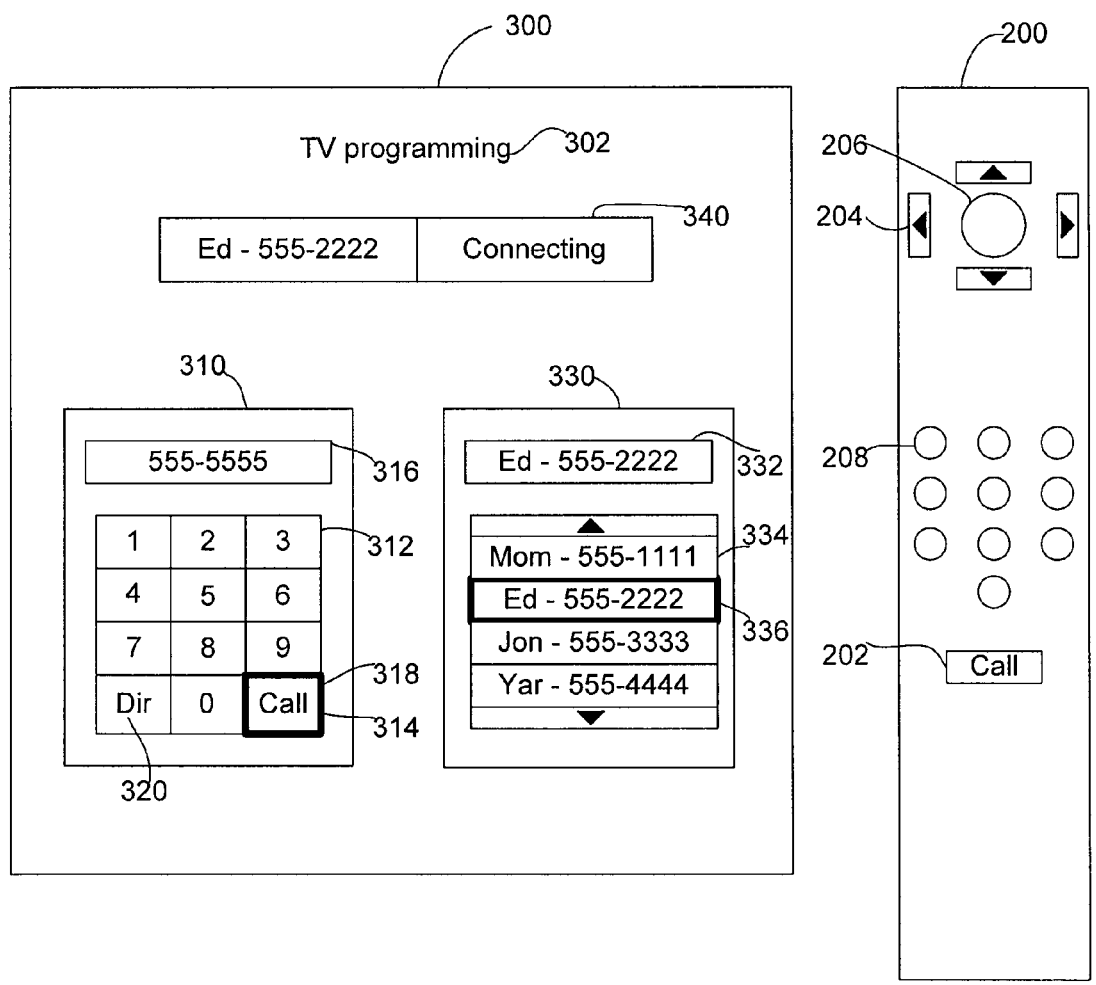
FIG. 3 shows one embodiment of an illustrative display screen and user control device in accordance with the principles of the present invention.

FIG. 3 shows an illustrative display 300 in accordance with an embodiment of the present invention. With reference to FIG. 1, display 300 may be provided on screen 102 connected to set-top box 110. As seen in FIG. 3, a television program 302 may be continuously displayed in the background. In one approach, a user may indicate a desire to place an outbound telephone call through the set-top box 110 by pressing "call" button 202 on user input device 200. The set-top box 110 may then display an on-screen dial pad 310 including numeric buttons 312, a call button 314, and a display 316. A cursor 318 may also be provided to enable navigation of the dial pad 310. The user may then utilize arrow keys 204 and select key 206 on the input device 200, in cooperation with cursor 318, to enter a telephone number to be dialed. Alternatively, the user may enter the telephone number to be dialed using the numerical key pad 208 and "call" button 202 provided on user input device 200.

In another approach, a user may be provided a directory of telephone numbers customized for the user. In instances where multiple users share access to a single set-top box 110, individualized telephone directories may be provided for each user. In one example where the set-top box 110 currently keep a caller ID directory of incoming telephone calls, this caller ID directory may form the basis of the telephone directory provided to the user for outbound phone calls. The user may also be able to add further telephone numbers to the existing caller ID directory or create a completely new directory using graphical interfaces implemented on the set-top box 110 and displayed on screen 120. Alternatively, a separate interface, such as an Internet web site, may also be provided for editing and saving a user's telephone directory. The telephone directory information may be stored locally on the set-top box memory 124 or may be stored at a remote database (e.g., at the media signal source 130) and provided to the set-top box 110 on demand or updated regularly at the set-top box in a manner similar to program guide information.

An exemplary implementation of the directory approach is shown in FIG. 3, where the user may select "directory" key 320 to initiate access to the telephone directory 330. Directory 330 may include a display 332 that shows a currently selected telephone number, directory entries 334, and a cursor 336. The user may similarly navigate directory 330 using arrow keys 204 and select key 206 to place outgoing telephone calls.

User input device 200 may also be used to navigate display 300 or dial a telephone number in response to a user's movement of user input device 200. For example, navigation of cursor 336 may be accomplished by the lateral, vertical, or diagonal movement of user input device 200. In such an embodiment, user input device 200 may include an accelerometer or other motion detection technology to detect movement in a particular direction. Similarly, user input device 200 may include a light or laser emission device suitable to select a portion of display 200 corresponding to a number or button a user may wish to select. Such display may be a light-sensitive version of a touch-display selecting a particular input or option in response to detecting a focused beam in a particular region of display 300—such as displays used with light-pen technology. In one embodiment, a user may select certain telephone numbers for speed dial capability. In such an embodiment, moving user input device 200 up and to the left may cause set-top box 110 to dial and attempt to connect a call to the user's mother. Moving user input device 200 to the right may cause set-top box 110 to dial voicemail after a call has been missed.

Once the user has selected a telephone number to be dialed, the call is initiated by the modem 116. As the call is pending, an on-screen display may be used to indicate a status of the outbound call. For example, as shown in FIG. 3, a status display 340 may be shown indicating that the call is "CONNECTING." Similarly, the on-screen display 340 may also indicate that the call is "BUSY," "CONNECTED," or "ENDED." One or more of on-screen displays 310, 330, and 340 may be partially transparent such that an underlying image on the screen may still be viewed when the display is being shown. It should be understood that although displays 310, 330, and 340 are all shown on illustrative display 300, this is not a requirement of the invention. In some embodiments, displays 310, 330, and 340 may be sequentially provided such that each previous display is removed when the next display is generated.

When the call is connected, the set-top box 110 may display a message or emit an alarm prompting the user to take the call using a telephone device 132 connected to the same local telephone network 130 to which the set-top box 110 is connected. In another arrangement, the set-top box 110 may include or may be connected to a speaker and microphone that enables the user to take the call without using another telephone device 132. In one particular embodiment, the set-top box 110 may have a Bluetooth® wireless capability that enables the user to take the connected call using a wireless headset. In another embodiment, the set-top box 110 may include an integrated speaker and microphone. In one particular approach, the set-top box 110 may automatically mute any sound component of the media signal (e.g., television program 302) when the outbound telephone call is connected. Doing so enables the user to complete the telephone call without disruption, and may be necessary in arrangements where a separate telephone device is not used.

Figure 4:
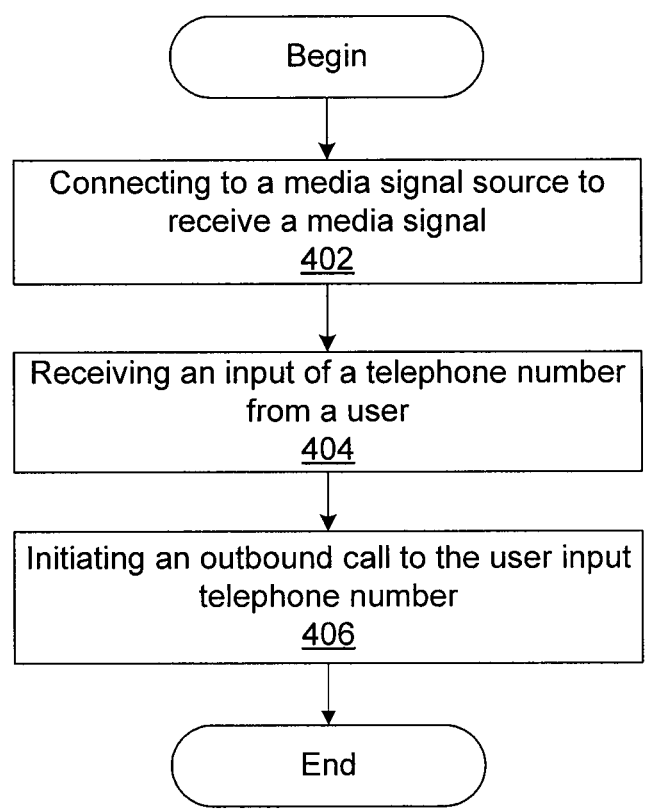
FIG. 4 illustrates one embodiment of a flow chart illustrating a method in accordance with the principles of the present invention.

FIG. 4 illustrates a method in accordance with one embodiment of the present invention. At step 402, the set-top box is connected to a media signal source to receive a media signal. For example, the set-top box 110 may be connected to a cable system headend via media connection 112 to receive a television signal. At step 404, the set-top box receives an input of a telephone number from a user. For example, the user may use input device 200 and on-screen displays 310 or 330 to input a telephone number for an outgoing call. At step 406, the set-top box initiates an outbound telephone call to the user input telephone number. For example, the modem 116 dials the user input telephone number and places the call to the public telephone network 160. Further methods of the present invention include (1) indicating a status of the outbound call using an on-screen display; (2) enabling the user to take the telephone call using a telephone device connected to a home telephone network; (3) enabling the user to take the telephone call using a speaker and microphone connected to the set-top box; (4) providing the user access to a directory of telephone numbers for initiating an outbound call; and (5) providing the user access to an on-screen dial pad for initiating an outbound call.

Figure 5:
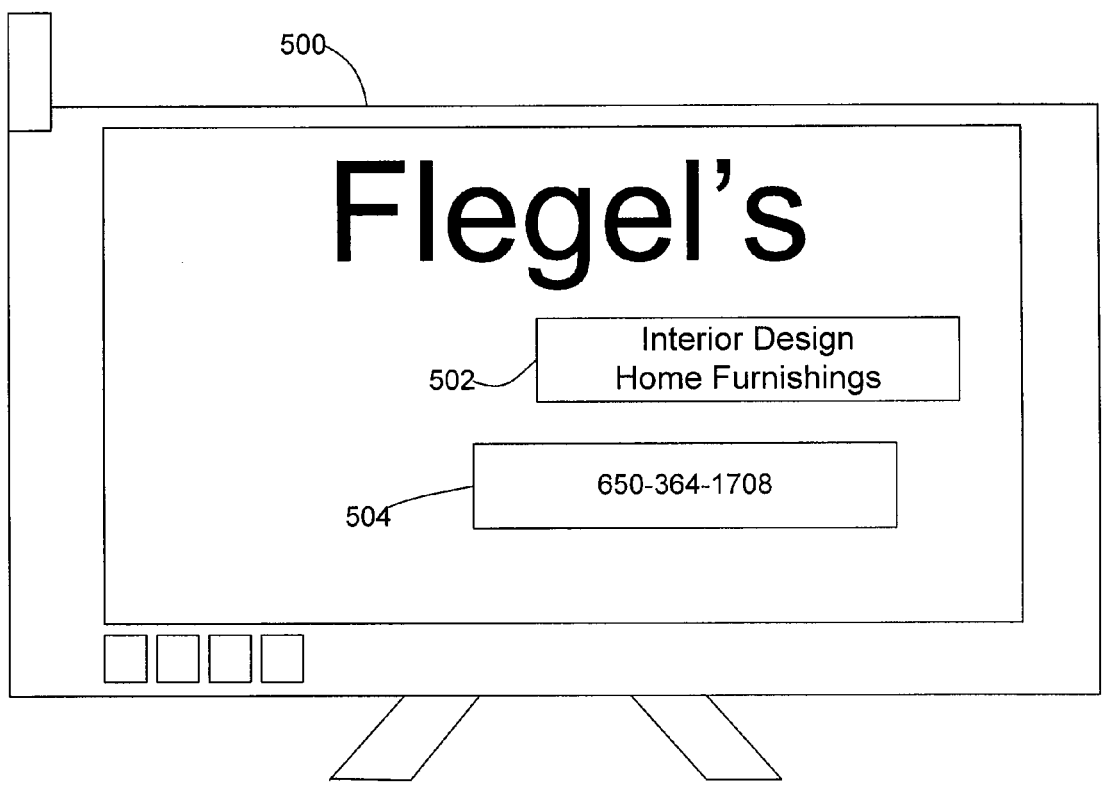
FIG. 5 illustrates one embodiment of an illustrative display screen in accordance with the principles of the present invention.

In another embodiment of the present invention, the user may initiate an outbound telephone call to a telephone number visually displayed on screen 120 as part of the displayed media signal. For example, as illustrated by FIG. 5, display 500 is a television program signal received from media signal source 130. As is commonplace with television advertisements, telephone numbers are frequently displayed to enable the user to order an item or receive further information. As shown in FIG. 5, such a telephone number 502 may be displayed at the bottom of the screen during a segment of the television program.

Figure 6:
FIG. 6 illustrates one embodiment of the structure of contact data in accordance with the principles of the present invention.

In one approach for implementing this feature, the telephone number 502 displayed on the screen may be transmitted as part of the television signal carrying the program. For example, as shown in FIG. 6, an additional piece of contact data 600 including telephone number 502 may be transmitted along with a segment of the media signal associated with the telephone number. For example, contact data 600 containing a particular telephone number 502 associated with a television commercial may transmitted with the television signal the commercial. Contact data 600 may further include an identifier 602 that enables the user to quickly identify the media segment with which the telephone number 502 is associated. For example, with reference to FIGS. 5 and 6, the contact data 600 for the television commercial displayed in FIG. 5 may be "Interior Design Home Furnishings—650 364 1708." Once received at set-top box 110, contact data 600 may be extracted from the media signal for use in initiating an outbound telephone call. It should be noted that the media segment associated with a telephone number 502 is not limited to segments of a television signal and may be an audio or video segment, a photograph, an Internet website, or any other suitable package of media data.

In another approach for implementing this feature, the contact data 600 for a television program may be transmitted along with the program guide data for the television program (e.g., plot synopsis, actor information, etc.). For example, program data may be provided to the set-top box 110 when modem 116 calls a designated number to negotiate a download of updated program guide data. The contact data 600 associated with particular television programs may be stored in an additional field of the regularly updated program guide data and may be extracted for use in initiating an outbound telephone call to the telephone number displayed in a television program.

In another approach for implementing this feature, an optical character recognition ("OCR") program may be used to isolate telephone numbers contained in the media signal and displayed on the screen. For example, in the context of a video signal such as a television signal, video text recognition ("VTR") programs may be used to extract character data from a moving video image. One example of such software is ConTEXTract™ offered by SRI International, 333 Ravenswood Avenue, Menlo Park, Calif. 94025 (more information available at http://www.sri.com/esd/automation/video_recog.html). Similarly, existing OCR programs may be used to extract character data from graphics, still images, Internet websites, and other suitable types of media files. The extracted characters may be processed to isolate the numerical data that appear in the format of a telephone number. For example, in the U.S., numerical strings having a length of seven, ten, or eleven numbers may be isolated as probable telephone numbers. In some instances, other character data may also be retained for use as the identifier portion of the contact data. For example, with reference to FIG. 5, telephone number 502 may be isolated for use in outbound calling and text 504 may also be retained for use as the identifier 602.

The OCR and VTR programs used to extract character data from the media signal may be stored on set-top box memory 124 and implemented locally using processor 122. Alternatively, the OCR and VTR programs may be located at a remote location, such as the media source 130. In such an arrangement, the character extraction and telephone number isolation may occur at the remote location and the extracted contact data may be transmitted in accordance with either of the two previous approaches for implementing this feature (i.e., contact data 600 may be transmitted with the media signal or as part of the program guide data).

In one approach to the user interface, the user may initiate a telephone call to a displayed telephone number 502 by pressing and holding the "call" button 202 on user control device 200 during the time the phone number 502 appears on the screen. In the same manner as the previously described outbound calling feature, when the call is initiated the modem 116 dials the user indicated telephone number 502 and the set-top box 110 may provide similar call status and answering features for the outbound call. In another approach to the user interface illustrated by FIG. 5, a cursor 506 may appear on the screen highlighting the telephone number 502 associated with the displayed media signal. The user may then press the "select" key 206 on user control device 200 to initiate an outbound call using the highlighted telephone number 502. This approach may be particularly useful in instances where more than one telephone number appears on screen, in which case the user may navigate the cursor 506 with arrow keys 204 to select a desired telephone number for the outbound call.

Figure 7:
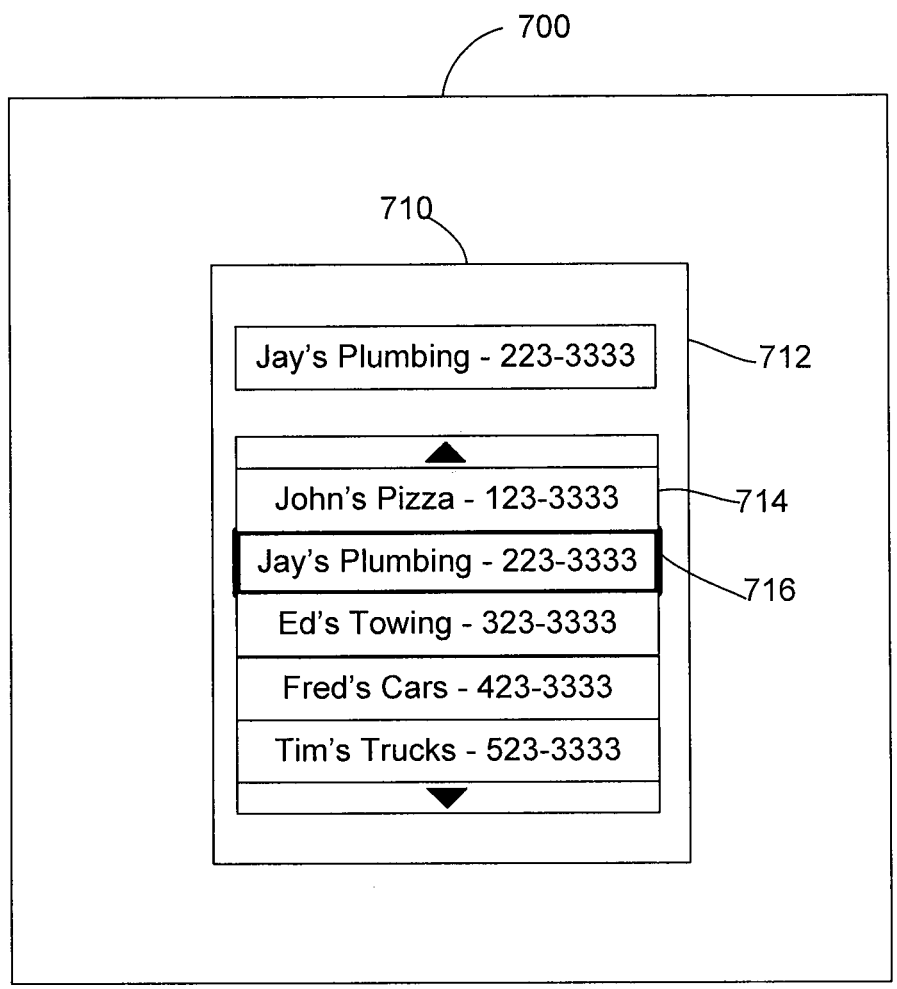
FIG. 7 illustrates one embodiment of an illustrative display screen in accordance with the principles of the present invention.

In yet another approach to the user interface, a list of contact data 600 received or captured from the media signal may be stored in memory 124 on the set-top box 110. When the user indicates a desire to place an outbound call, an option may be presented to view the list of telephone numbers 502 from past media segments (e.g., telephone numbers associated with television commercials that have aired). As illustrated by FIG. 7, when a user indicates a desire to place an outbound call, a display 700 may be provided on screen 120 that includes a directory 710 of contact data 714 associated with past media segments. Contact data 714 may be similar to previously described contact data 600 and may include a phone number and a brief descriptor associated with the phone number. The user may utilize arrow keys 204 on control device 200 to navigate the highlight 716 to a desired contact 716 to initiate an outbound call. This approach may be advantageous in that it removes the time limitation associated with calling an on-screen telephone number and enables the user to place calls to recently viewed telephone numbers.

Figure 8:
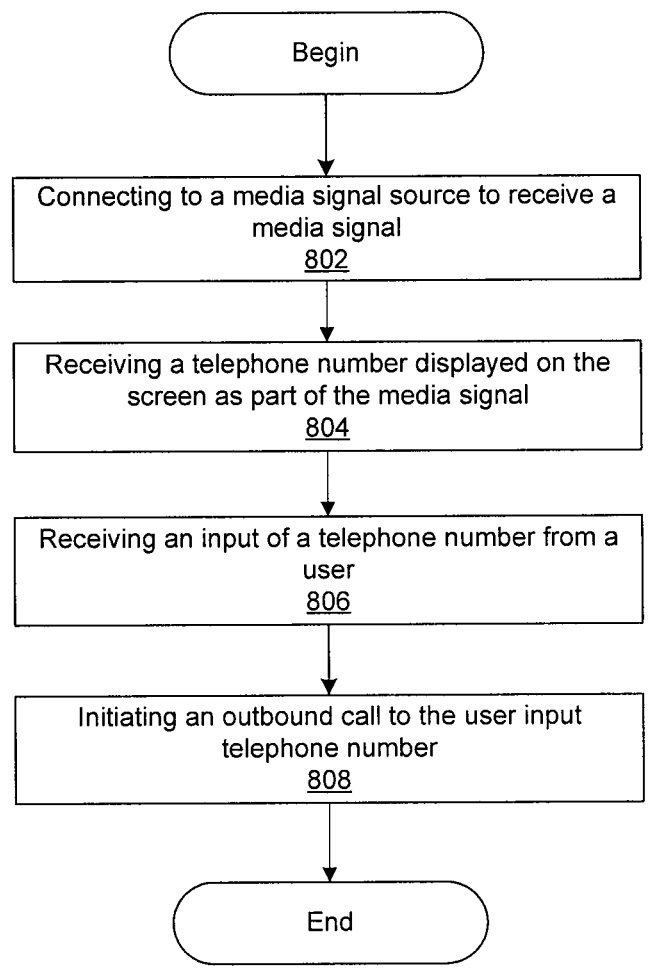
FIG. 8 is a flow chart illustrating one embodiment of a method in accordance with the principles of the present invention.

FIG. 8 illustrates a method in accordance with one embodiment of the present invention. At step 802, the set-top box is connected to a media signal source to receive a media signal. For example, the set-top box 110 may be connected to a cable system headend via media connection 112 to receive a television signal. At step 804, the set-top box receives a telephone number displayed on the screen as part of the displayed media signal. For example, the set-top box 110 may receive telephone number 502 being displayed on screen 120 as part of a television commercial. At step 806, the set-top box receives an input of a telephone number from a user. For example, the user may use input device 200 to select a telephone number 502 displayed on screen 120 for an outgoing call. At step 808, the set-top box initiates an outbound telephone call to the user input telephone number. For example, the modem 116 dials on-screen telephone number 502 and places the call to the public telephone network 160. Further methods of the present invention include (1) extracting a telephone number from the media signal using character recognition software; (2) receiving a telephone number displayed in the media signal at the set-top box; and (3) providing the user access to a directory of telephone numbers displayed in the media signal for initiating an outbound call.

Figure 9:
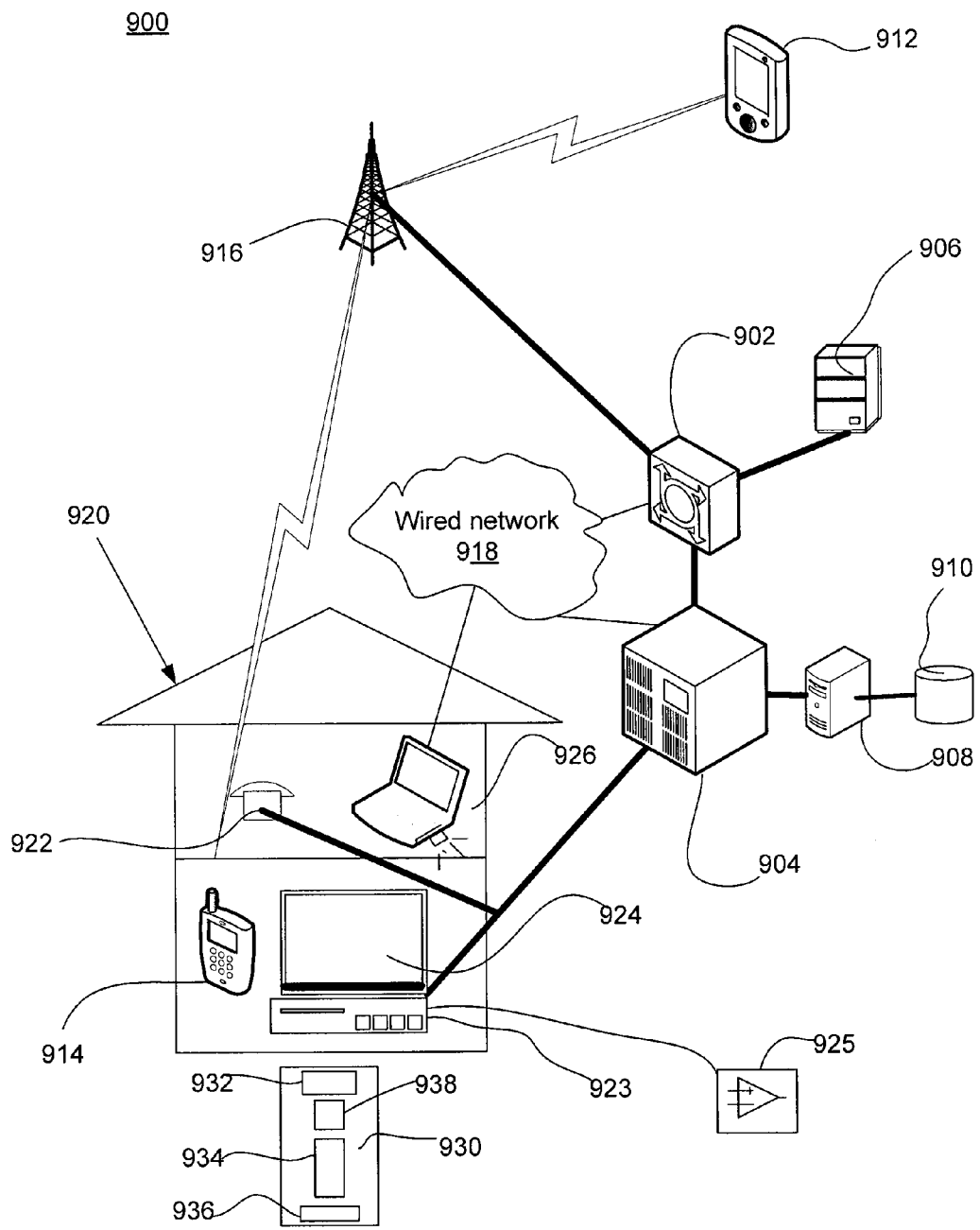
FIG. 9 is an illustrative representation of one embodiment of a communications system in accordance with the present invention.

FIG. 9 is a pictorial representation of a communications system in accordance with an illustrative embodiment. The communication system 900 of FIG. 1 includes various elements used for wireless and wired communication. The communications system 900 includes a mobile switching center (MSC) 902, a local exchange 904, voicemail systems 906 and 908, a database 910, wireless devices 912 and 914, a transmission tower 916, a wired network 918, a home 920, home telephone 922, a set-top box 923, a display 924, and a client 926. The different elements and components of the communications system 900 may communicate using wireless communications, such as satellite connections, WiFi, WiMAX, CDMA wireless networks, and/or hardwired connections, such as fiber optics, T1, cable, DSL, high speed trunks, and telephone lines.

The wireless devices 912 and 914 may communicate with the transmission tower 916 using communications protocols, such as time division multiple access (TDMA), code division multiple access (CDMA), global systems for mobile (GSM) communications, personal communications systems (PCS), WiFi, WLAN, WiMAX, or other frequently used cellular and data communications protocols and standards. The wireless devices 912 and 914 may include cellular phones, Blackberry® devices, personal digital assistances (PDA), mp3 players, laptops, evolution data optimized (EDO) cards, multi-mode devices, and other wireless communication devices and elements.

Communications within the communications system 900 may occur on any number of networks which may include wireless networks, data or packet networks, cable networks, satellite networks, private networks, publicly switched telephone networks (PSTN), the wired network 918, or other types of communication networks. A communications network is the infrastructure for sending and receiving signals and messages according to one or more designated formats, standards, and protocols. The networks of the communications system 900 may represent a single communication service provider or multiple communications services providers. The features, services, and processes of the illustrative embodiments may be implemented by one or more elements of the communications system 900 independently or as a networked implementation.

In one embodiment, the MSC 902, voicemail systems 906 and 908, and transmission tower 916 are part of a wireless network that is operated by a wireless service provider. For example, the control signals and operational features may be performed by the MSC 902 and the wireless signals may be broadcast from the transmission tower 916 to the wireless devices 912 and 914. The wireless network may include any number of systems, towers, servers, and other network and communications devices for implementing the features and performing the methods herein described. The wireless network may enable cellular, data, radio, television service, or other wireless schemes. For example, the transmission tower 916 may transmit signals to cell phones, Blackberry® devices, car radios, and high definition televisions.

The MSC 902 may be a switch used for wireless call control and processing. The MSC 902 may also serve as a point of access to the local exchange 904. The MSC 902 is a telephone exchange that provides circuit switched calling and mobility management and may also provide GSM or PCS services to the wireless devices 912 and 914 located within the area the MSC 902 serves. The MSC 902 may include or communicate with a home location register (HLR) and visitor location register (VLR) that may be used to implement different features of the illustrative embodiments. The voicemail system 906 may be an integrated part of the MSC 902 or alternatively may be an externally connected device.

In one embodiment, the voicemail system 906 may include an integrated database for storing customer and usage information, electronic profiles, and data. In another embodiment, the voicemail system 906, a server, or other intelligent network device may store user preferences, applications, features, messages, and implementation logic, as further described herein. The user may communicate, interact, or send and receive data, information, and commands to the voicemail system 906 through the telephone 922, set-top box 923, display 924, wireless device 912 and 914, or the client 926. The MSC 902 and voicemail system 906 may include any number of hardware and software components. In one embodiment, the MSC 902 is an advanced intelligence network device with software modules equipped to perform a do-not-disturb feature.

The local exchange 904, the MSC 902, and/or other elements of the communications system 900 may communicate using a signal control protocol, such as a signaling system number 7 (SS7) protocol or TCP/IP protocols. The SS7 protocol or similar protocols are used in publicly switched networks for establishing connections between switches, performing out-of-band signaling in support of the call-establishment, billing, routing, and implementing information-exchange functions of a publicly switched network or the wired network 918. The local exchange 904 may be owned and operated by a local exchange carrier that provides plain old telephone service (POTS) to any number of users. In one embodiment, the local exchange 904 may be a class 5 switch that is part of the network systems of the local carrier. The local exchange 904 may include or may be connected to the voicemail system 906. However, the local exchange 904 may also be a Digital Subscriber Line Access Multiplexer (DSLAM), Internet Protocol (IP) gateway, base station, or any other suitable network access point.

The local exchange 904 may be a wire-line switch or public exchange using time domain multiplexing to provide telecommunications services to a particular subscriber or group of subscribers. The local exchange 904 may be located at a local telephone company's central office, or at a business location serving as a private branch exchange. The local exchange 904 may provide dial-tone, calling features, and additional digital and data services to subscribers, such as the home telephone 922. The local exchange 904 may also enable VoIP communication of the home telephone 922 through a data network. VoIP works by sending voice information in digital form, such as packets, rather than using the traditional circuit-committed protocols of the publicly switched network. The local exchange 904 may be or include a feature server, a call control agent, an IP gateway, and other devices or applications for implementing VoIP communications. In one embodiment, the local exchange 904 may be more than one distributed devices, such as an IP gateway in communication with a call control server, such as a Session-Initiation Protocol (SIP) server for setting up Voice-over Internet Protocol (VoIP) calls.

The communications system 900 may further include any number of hardware and software elements that may not be shown in the example of FIG. 1. For example, in order to facilitate VoIP communications, the communications system 900, and the MSC 902 and local exchange 904, in particular, may include additional application servers, media servers, service brokers, call agents, edge routers, gateways (signaling, trunking, access, sub, etc.), IP network service providers, adapters, exchanges, switches, users, and networks. The voicemail system 908 is similar to the voicemail system 906 except that it is equipped to handle voicemail for landline customers rather than wireless customers.

The MSC 902 and the local exchange 904 may include an authentication space. The authentication space may be a partition, module, or other storage or memory of the server designated by the communications service provider. The authentication space may validate that a user or device, such as client 926, is allowed to authorize the MSC 902, local exchange 904, servers, switches, network devices, or corresponding voicemail systems 906 and 908 to set preferences, implement changes, review information, or perform other updates. For example, a user may first be required to provide a secure identifier, such as a user name, password, or other authentication code or hardware interface, to verify the user is authorized to make changes to a feature within the authentication space.

The authentication information may also be used to create a secure connection between the client 926 and the MSC 902, a server, or the local exchange 904. The secure connection may be a virtual private network tunnel, an encrypted connection, firewall, or other form of secured communications link. The MSC 902 and local exchange 904 may use any number of gateways, proxies, applications, or interfaces for allowing the client 926 to communicate with the MSC 902 and local exchange 904 through the wired network 918. Alternatively, the client 926 may use a wireless network or other network to access the MSC 902 and local exchange 904. The MSC 902 and local exchange 904 may use a host client application for communicating with numerous clients.

The home 920 is an example of a dwelling, residence, or location of a person or group that may utilize any number of communications services. The home 920 is shown as a residence in the illustrated example, however, the home 920 may also be an office, business, or other structure wired or otherwise suitably equipped to provide telephone, data, and other communication services to one or more customers. In one embodiment, the home 920 is equipped with multiple communication devices, including home telephone 922 and client 926. The home telephone 922 may be standard devices that provide dialing and voice conversation capabilities. Home telephone 922 may be integrated in any number of other devices or may be used in different forms. For example, the home telephone 922 may be part of a refrigerator or intercom system. In another embodiment, the home telephone 922 may be integrated with a personal computer, such as client 926.

The communications services accessible from the home telephone 922 may include POTS or VoIP telephone service. The home telephone 922 may be VoIP telephones or may be standard telephones that include a modem and/or VoIP adapters for enabling VoIP communications. A special dial tone, message, web alert, or other feedback may specify once or repeatedly that the home telephone 922 is implementing a particular feature.

The client 926 may be a personal computer for performing and executing programs and instructing and accessing the wired network 918. However, the client 926 may be any computing device suitable for communicating with the wired network 918 through a network connection. The wired network 918 may be a fiber optic, cable, or telephone network or other wired network suitable for communication over a hard wired connection with the client 926. In one embodiment, the home 920 may include a wireless router, adapter, switch, hub, or other suitable interface that allows the client 926 to communicate with the wired network 918. Alternatively, the client 926 may communicate with the wired network 918 through a wireless connection. The set-top box 923 and the display 924 may also communicate through the wired network 918.

The set-top box 923 is a device that configures media content for display by the display 924. In one embodiment, the set-top box 923 may function as a receiver, a digital video recorder, and a personal video recorder for displaying any number of audio, video, or static media content through speakers, the display 924 or other interconnected devices. For example, the set-top box 923 may process media signals from a satellite provider, cable provider, DSL connection, Internet Protocol television (IPTV) connection, or other connection types and/or providers. In one embodiment, the set-top box 923 also includes a modem for dialing and connecting telephone calls. In yet another embodiment, the set-top box 923 also includes a digital telephony client communicating using any suitable voice protocol such as VoIP. The digital telephony client may include a SIP stack for conducting a VoIP voice call. Alternatively, a peer-to-peer digital telephony client such as a Skype® client or any other suitable digital telephony client may be utilized.

In one embodiment, the set-top box 923 may communicate with the local exchange 904 to set-up a VoIP call using, for example, a SIP protocol. In such an embodiment, the set-top box 923 would communicate through an IP gateway to a call control server in order to set up an incoming voice call path and an outgoing voice call path between the set-top box and a device associated with a selected telephone number or IP address. In an alternative embodiment, the set-top box 923 may communicate through an IP gateway to a call control server (such as a call control manager) in order to set up an incoming voice call path and an outgoing voice call path between a device associated with a selected telephone number or IP address and a second device designated by the set-top box 923 or selected by a user of the set-top box 923. For purposes of this application, calling party number and originating number shall be used to refer to a telephone number or IP address of a party initiating a telephone call and a called party number and destination number shall be used to refer to a number of a party designated as the recipient of a telephone call.

In one embodiment, the user of the set-top box 923 may be prompted to take the call in response to a call control server, MSC, or local exchange causing a telephone of the user to ring where such telephone is not connected to the same network as the set-top box 923. In such an embodiment, the IP address or telephone number for such telephone of the user may be stored by the set-top box 923 or selected or input by the user. In such an embodiment, the set-top box 923 would instruct the call control server, MSC, or local exchange to utilize such IP address or telephone number instead of the IP address or telephone number of the set-top box 923 as the originating number when setting up a call. The call control server, MSC, or local exchange could be easily modified to generate a ring to the originating number upon connection of the call to a destination number, while, for example, playing a prerecorded message, tone, or other audio output to the person answering the call at the destination number. In one embodiment, the set-top box 923 may select one of several IP addresses or telephone numbers to use as an originating number in response to a user selection or automatically by detecting the identity of the user, the location of the user, or any other suitable criteria. For example, the set-top box 923 may show that a particular user is using the set-top box 923, either because of login information or in response to known viewing patterns of the user. In such example, the cell phone number of that particular user will be used as the originating number. In one embodiment, a plurality of set-top boxes 110 may be networked and share the call set-up platform to initiate telephone calls. In such an embodiment, an originating number corresponding to a telephone number or IP address of a device located in the same room as the set-top box being accessed by the user to, for example, watch television.

The set-top box 923 may also include a noise cancellation generator 925. In one embodiment, the noise cancellation generator 925 is an application specific integrated circuit operable to receive an audio signal, generate an inverse of such audio signal, and output such inverse for combination with the original audio signal over, for example, the outbound voice path of a telephone call. In one embodiment, noise cancellation generator 925 may include hardware and software components, and may receive as an input an audio signal either from the audio out path of a speaker of a television or surround sound system, from a microphone input receiving an audio signal from a speaker of a television or surround sound system, or directly from a cable television feed or other audio channel received over a network, from a prerecorded medium, or other audio source. In one embodiment, in response to a telephone call being connected between a user of a set-top box and a called party, the set-top box may communicate information to a set-top box of the called party over the network utilized to provide television services. For example, a television signal being viewed by a user of the set-top box may be communicated to the called parties' set-top box such that both parties may view the same television content. Information regarding calls made by a user of a set-top box may also be communicated over the network used to provide services to a set-top box. For example, call information may be logged and tracked for purposes of record keeping and/or billing by a provider of network services.

In one embodiment, the set-top box 923 includes a network-to-network interface capable of translating digital packet telephony calls to analog telephony calls and vice versa. More particularly, the set-top box 923 includes the functionality to disassemble IP packets that may include call signaling and voice data into the separate signaling and data components necessary to communicate with an analog telephony network.

The display 924 is a device for visually displaying and presenting media content. In one embodiment, display 924 is a television. The display 924 may also be a laptop, desktop, projector, monitor, or other device suitable for playing an audio-visual selection.

Communications system 900 also includes a remote control 930. In one embodiment, the remote control 930 is the user input device 200. The remote control 930 includes a transmitter 932 for communication with the set-top box 923. In one embodiment, such transmitter is an infrared transmitter. However, alternatively, such transmitter may be a light emitting diode, a wireless transmitter, or any other suitable component suitable to communicate information to the set-top box 923. In yet another embodiment, the transmitter is a wireless transceiver in communication with the set-top box, for example, in the manner of wireless devices 912 and 914. For purposes of this application, a remote control equipped with a wireless transceiver shall also be referred to as a wireless set. The remote control also includes a user interface 934. In one embodiment, the user interface 934 includes buttons for indicating the selections of a user. Alternatively, the user interface may include buttons, dials, wheels, graphical user interfaces, touch screens, or accelerometers suitable for indicating the selections of a user. In one embodiment, the user interface 934 also includes a microphone 936 and a speaker 938. In yet another embodiment, the remote control 930 is a dumb wireless set. For purposes of this application, a "dumb wireless set" shall mean a wireless device with no user interface other than a microphone and speaker.

Figure 10:
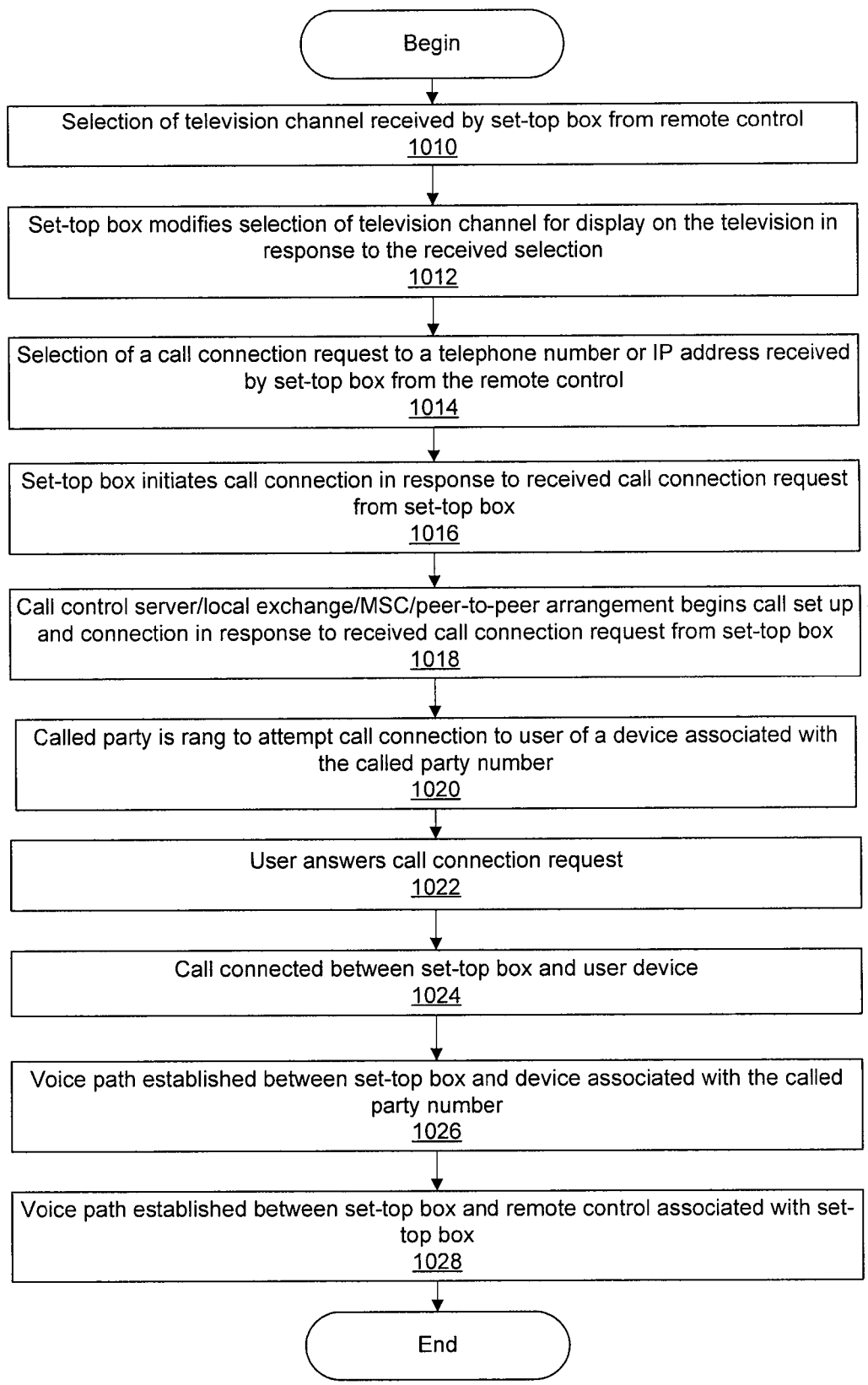
FIG. 10 is an illustration of one embodiment of a method for establishing a voice call.

FIG. 10 illustrates one embodiment of a method for establishing a voice call. In step 1010, an input of a selection of a television channel is received by a set-top box from a remote control. In step 1012, the set-top box modifies the selection of a television channel for display on a television in response to the received selection. In step 1014, the selection of a call connection request to a particular telephone number or IP address is received by the set-top box from the remote control. In step 1016, the set-top box initiates a call connection request to the telephone number or IP address received from the remote control. In step 1018, a call control server, local exchange, MSC, or peer-to-peer arrangement begins call set up and connection in response to receiving the call connection request from the set-top box. In step 1020, a destination number or called party number is rang to attempt to call connection to a user of a device associated with the destination number or called party number. In step 1022, the user of such device answers the call connection request. In step 1024, a call is connected between the set-top box and such device. In step 1026, a first portion of a voice path is established between the set-top box and the device associated with the destination number or called party number. In step 1028, a second portion of a voice path is established between the set-top box and a remote control associated with such set-top box.

Such method may also include visual indicators or audio indicators displayed or played by the set-top box over a television, or other display or speaker. For example, visual and/or audio indicators may be utilized to indicate that a telephone number has been dialed, a receiving party has answered a telephone call, or that a user of a remote control should press a button or pick up a remote control, in each case in order to conduct a successfully connected voice call with a called party. In one embodiment, the set-top box communicates a ringing signal over a speaker of a television or a speaker on a remote control to indicate that a call has been connected.

Figure 11:
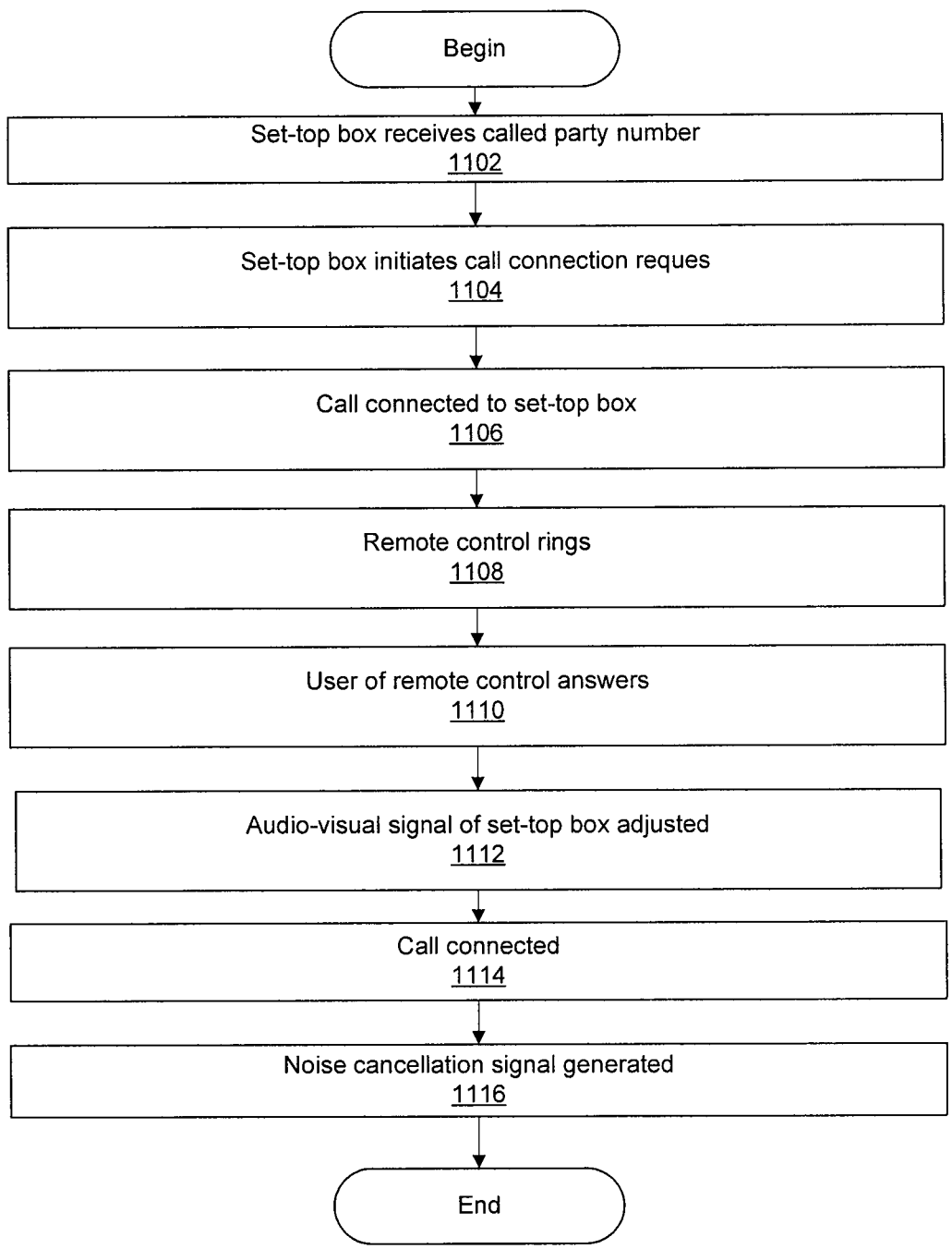
FIG. 11 is an illustration of another embodiment of a method for establishing a voice call.

FIG. 11 illustrates one embodiment of a method for establishing a voice call. In step 1102, a set-top box receives a called party number or destination number. For example, a set-top box could receive a number dialed into a keypad or a graphical user interface on a remote control. Alternatively, the set-top box could receive a called party number via a selection in a frequently called party list and/or telephone number or IP address included in an address book, caller ID listing, or telephone directory. Alternatively, set-top box could receive a called party number through a user's selection of a graphical user interface displayed on a television by the set-top box. In one embodiment, the set-top box is equipped with voice recognition technology such that voice dialing and/or a voice command could be used to select a called party name or number.

In step 1104, the set-top box initiates a call connection request. In such an embodiment, the set-top box could initiate a call connection request over an Internet protocol network to a call control server or directly to a called party device using a Voice over IP Protocol configured in a client server or peer-to-peer arrangement. Alternatively, the set-top box could initiate a call by dialing via a modem or other telephone dial tone generator to communicate with a local exchange to connect a call using the PSTN. Alternatively, the set-top box may be equipped with its own SIM card and other functionality necessary for it to connect directly with a base station and associated MSC of a cellular network.

In step 1106, the call is connected to the set-top box. More particularly, a call connection has been made with a device associated with a called party number and/or destination number and a voice call has been connected to the set-top box. In step 1108, a remote control ring or other audio, visual, or tactile output is communicated by a remote control, the set-top box, a television, or other device to alert a user of the set-top that the call has been connected. In step 1110, the user answers the call using the remote control. For example, the user of the remote control may select a talk button, may pick up the remote control, or may perform any other action to answer the call and begin speaking. Alternatively, the microphone and/or speaker of the remote control may automatically be triggered by the set-top box when a voice connection has been established.

In step 1112, an audio visual signal of the set-top box is adjusted. For example, the set-top box may reduce the volume of a television and or display a visual prompt that a call is in process. Alternatively, the audio visual signal of a television may be muted in response to an indication that a call has been connected to the set-top box. In step 1114, in response to the user of the remote control answering the telephone call, a complete voice connection is established between the remote control, the set-top box, and the device of the called party number or destination number.

In step 1116, a noise cancellation signal may be generated. For example, in the event that the volume of a television is not adjusted automatically or by user preference in response to a call being connected, a noise cancellation signal that is the inverse of the audio output of a television may be generated by the set-top box so that the called party will be able to hear the voice of the calling party despite the background noise of the television. Such noise cancellation signal may be generated by detecting the output of the speakers of, for example, a television or surround sound system. Alternatively, a noise cancellation signal may be generated in response to receiving the audio signal associated with a television channel over a cable or other television network. In such a manner, a noise cancellation signal may be generated without the delay introduced by waiting to cancel a noise generated by the speakers of a television or surround sound system. In such a manner, a noise cancellation signal may be generated at approximately the same time as a television audio signal is generated by the speakers of a television or surround sound system.

Figure 12:
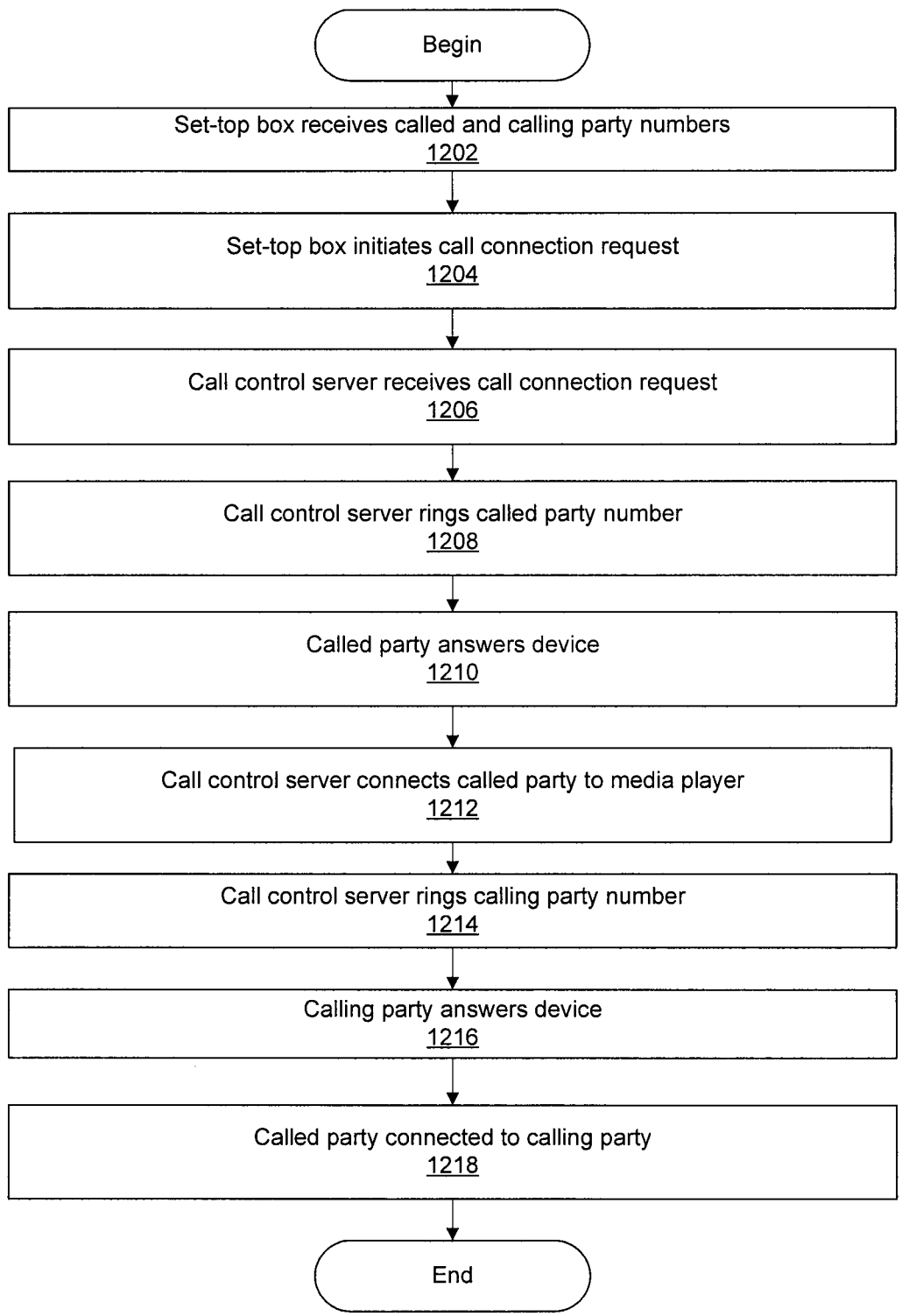
FIG. 12 is an illustration of one embodiment of a method for initiating a voice call.

In FIG. 12, one embodiment of a method for initiating a voice call is illustrated. In step 1202, a set-top box receives a called party number or origination number and a calling party number or destination number. In step 1204, the set-top box initiates a call connection request for a call to be conducted between the called party and calling party numbers. In step 1206, a call control server receives the call connection request. In step 1208, the call control server rings the called party number. In step 1210, the called party answers a device associated with a called party number. In step 1212, the call control server connects the called party to a media player. In such a manner, a media player may play an audio message, tone, or other recording to the answering call party while the call is connected to the calling party. In step 1214, the call control server rings the calling party's number. In step 1216, the calling party answers a device associated with the calling party number. For example, the device may be a cell phone connected over a CDMA network, an IP device connected over an IP network, or a residential telephone connected over the PSTN. In such a manner, a set-top box may be utilized to initiate and connect a call between two subscribers to any number of telephone service provider networks. Importantly, in such an embodiment, it is unnecessary for a calling party to utilize the network or service provider providing set-top box service to conduct the actual voice call. In step 1218, the called party is connected to the calling party and a voice path is established between the two parties.

Although the principles of the present invention have been described in terms of the foregoing embodiments, this description has been provided by way of explanation only, and is not intended to be construed as a limitation of the invention. Those skilled in the art will recognize modifications of the present invention that might accommodate recording one-way speech signal samples. In particular, it should be understood that although the foregoing embodiments place some emphasis on the television context, the present invention is not limited to such implementations.

We claim:

1. A system for initiating a voice call, the system comprising:
   a set-top box operable to control a selection of a television channel for display on a television, the set-top box being further operable to initiate the voice call between a first telephone and a second telephone, wherein the set-top box is configured to extract contact information via text recognition of displayed media content of a media segment and execute instructions to maintain and update a directory of telephone numbers with the contact information extracted from the media segment received at the set-top box; and
   a remote control in communication with the set-top box, the remote control operable to receive an input associated with the selection of the television channel from a user, the remote control further comprising a call button, and wherein the set-top box is configured to initiate a call to a telephone number appearing on the television during the media segment based on the extracted contact information and in response to receiving a signal from the remote control while the media segment is displayed, wherein the signal is generated in response to the user pressing and holding the call button on the remote control during a time the telephone number appears on the television.

2. The system of claim 1, wherein the set-top box includes a digital telephony client, the digital telephony client operable to initiate the voice call.

3. The system of claim 1, wherein the set-top box includes a digital telephony client, the digital telephony client operable to initiate the voice call and request that a call control server ring both a called party number and a calling party number.

4. The system of claim 1, further comprising automatically dialing a first predetermined speed dial number in response to an indication indicating a first predetermined motion pattern movement of the remote control.

5. The system of claim 4, further comprising automatically dialing a second predetermined speed dial number in response to the indication indicating a second predetermined motion pattern movement of the remote control.

6. The system of claim 4, wherein the first predetermined speed dial number is a voicemail number and wherein first predetermined motion pattern is moving the remote control to the right following a missed call.

7. The system of claim 6, wherein the remote control further comprises a light emission device, and wherein the set-top box is configured to enable the user to select the telephone number for initiating the voice call using the light emission device of the remote control.

8. A method for initiating a voice call, the method comprising:
   configuring, using a processor, a set-top box to control a selection of a television program for display on a display device;

extracting, using a processor, contact information via text recognition of displayed media content of a media segment;

updating, using a processor, a directory of telephone numbers with the contact information extracted from the media segment received at the set-top box; and configuring, using the processor, the set top box to initiate a call to a telephone number appearing on the display device during the media segment based on the extracted contact information and in response to receiving a signal from a remote control associated with the set top box while the media segment is displayed, wherein the signal is generated in response to a user pressing and holding a call button during a time the telephone number appears on the display device.

9. The method of claim 8, further comprising automatically dialing a first predetermined speed dial number in response to an indication indicating a first predetermined motion pattern movement of the remote control.

10. The method of claim 9, further comprising automatically dialing a second predetermined speed dial number in response to the indication indicating a second predetermined motion pattern movement of the remote control.

11. The method of claim 9, wherein the first predetermined speed dial number is a voicemail number and wherein first predetermined motion pattern is moving the remote control to the right following a missed call.

12. A computer program product comprising computer executable instructions embodied in a tangible non-transitory computer-readable medium, the computer executable instructions comprising instructions to configure a set top box to:

extract a communication identifier via text recognition of displayed media content of a media segment;

update a directory of telephone numbers with the communication identifier extracted from the media segment; and initiate a communication to the communication identifier appearing on a screen during the media segment and in response to receiving a signal from a remote control of the set top box while the media segment is displayed, wherein the signal is generated in response to a user pressing and holding a call button during a time the communication identifier appears on the screen.

13. The computer program product of claim 12, wherein the computer executable instructions further comprises instructions to automatically dial a first predetermined speed dial number in response to an indication indicating a first predetermined motion pattern movement of the remote control.

14. The computer program product of claim 13, wherein the computer executable instructions further comprises instructions to automatically dial a second predetermined speed dial number in response to the indication indicating a second predetermined motion pattern movement of the remote control.

15. The computer program product of claim 13, wherein the first predetermined speed dial number is a voicemail number and wherein first predetermined motion pattern is moving the remote control to the right following a missed call.

* * * * *